US012651537B2

(12) United States Patent
Lima et al.

(10) Patent No.: US 12,651,537 B2
(45) Date of Patent: Jun. 9, 2026

(54) THREE-DIMENSIONAL TACTILE MAP SYSTEM

(71) Applicant: Board of Supervisors of Louisiana State University and Agricultural and Mechanical College, Baton Rouge, LA (US)

(72) Inventors: Marybeth Lima, Baton Rouge, LA (US); Bri Tramontana, Baton Rouge, LA (US); Kenzie Dupont, Baton Rouge, LA (US); Gracie Kennard, Baton Rouge, LA (US); Tiffany Le, Baton Rouge, LA (US); Cameron Matherne, Baton Rouge, LA (US); J. Fischer Robinson, Baton Rouge, LA (US); Thomas Tran, Baton Rouge, LA (US); Blanche Faulk, Baton Rouge, LA (US); Jennifer Gaudet, Baton Rouge, LA (US); Anna Gayle, Baton Rouge, LA (US); LaRonda Doakes, Baton Rouge, LA (US); Stacy Jena, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 1136 days.

(21) Appl. No.: 17/540,681

(22) Filed: Dec. 2, 2021

(65) Prior Publication Data

US 2022/0172645 A1    Jun. 2, 2022

Related U.S. Application Data

(60) Provisional application No. 63/120,447, filed on Dec. 2, 2020.

(51) Int. Cl.
   *G09B 21/00*      (2006.01)
   *B29C 64/393*     (2017.01)
   (Continued)

(52) U.S. Cl.
   CPC .......... *G09B 21/007* (2013.01); *B29C 64/393* (2017.08); *B33Y 50/02* (2014.12);
   (Continued)

(58) Field of Classification Search
   CPC .. G09B 21/007; G09B 29/004; B29C 64/393; B29C 64/386; B33Y 50/02; B33Y 80/00; B33Y 50/00; G06F 3/016
   (Continued)

(56) References Cited

U.S. PATENT DOCUMENTS 5,438,781 A * 8/1995 Landmann ................ G09F 7/00
                                                434/72
5,733,127 A * 3/1998 Mecum ............... E04F 13/0862
                                                40/585
(Continued)

OTHER PUBLICATIONS

Elaine S. Andersen et al. "The impact of input: language acquisition in the visually impaired". First Language, vol. 13, Issue 37, pp. 23-49. 1993.

(Continued)

*Primary Examiner* — Peter S Vasat
*Assistant Examiner* — Stephen Alvesteffer
(74) *Attorney, Agent, or Firm* — Thomas I Horstemeyer, LLP

(57) ABSTRACT

Various embodiments of a three-dimensional (3D) tactile map system and methods of implementing the system are described. In one example, the tactile map system includes a map base having a substantially planar substrate defining an x-y plane. The map base includes a top base surface and a bottom base surface, where the top base surface includes
(Continued)

a ground surface texture. The tactile map system also includes a 3D scaled representation of a structure attached to the top surface of the map base. The 3D scaled representation can be configured with dimensions that are in proportion to the structure and extend in a z-direction from the base. The z-direction being orthogonal to the x-y plane. The 3D scaled representation includes a plurality of identified surfaces, each of the plurality of identified surfaces having a surface type of a plurality of surface types, each surface type corresponding to a selected surface texture.

20 Claims, 9 Drawing Sheets
(6 of 9 Drawing Sheet(s) Filed in Color)

(51) Int. Cl.

| | |
|---|---|
| *B33Y 50/02* | (2015.01) |
| *B33Y 80/00* | (2015.01) |
| *G06F 3/01* | (2006.01) |
| *G09B 29/00* | (2006.01) |

(52) U.S. Cl.
CPC .............. *B33Y 80/00* (2014.12); *G06F 3/016* (2013.01); *G09B 29/004* (2013.01)

(58) Field of Classification Search
USPC ......................................................... 434/114
See application file for complete search history.

(56) References Cited

U.S. PATENT DOCUMENTS

| | | | | | |
|---|---|---|---|---|---|
| 6,342,831 | B1 * | 1/2002 | Azima | ................... | H04R 7/045 |
| | | | | | 340/384.73 |
| 11,138,790 | B2 * | 10/2021 | Haslam | ................... | G06F 18/24 |
| 11,331,938 | B1 * | 5/2022 | Kaplan | ................ | G09B 21/005 |
| 2014/0023996 | A1 * | 1/2014 | Finn | ...................... | B29C 64/112 |
| | | | | | 427/258 |

| | | | | | |
|---|---|---|---|---|---|
| 2014/0361453 | A1 * | 12/2014 | Triantafyllou | ......... | B33Y 10/00 |
| | | | | | 425/375 |
| 2016/0271881 | A1 * | 9/2016 | Bostick | ................. | G05B 15/02 |

OTHER PUBLICATIONS

Burriss et al. "How Much Do We Know about the Importance of Play in Child Development?". vol. 78, Issue 4, pp. 230-233. 2002.
Accessibility Section Acquisition and Development. "California State Parks Accessibility Guidelines". (Exhibits Section) <https://www.parks.ca.gov/pages/1008/files/2015_california_state_parks_accessibility_guidelines.pdf>. 314 pages. 2015.
Kenneth R. Ginsburg. "The Importance of Play in Promoting Healthy Child Development and Maintaining Strong Parent-Child Bonds". American Academy of Pediatrics. vol. 119, Issue 1, pp. 182-191. 2007.
Justin A. Haegele et al. "Prevalence of Meeting Physical Activity, Screen-Time, and Sleep Guidelines Among Children and Adolescents With and Without Visual Impairments in the United States". Adapted Physical Activity Quarterly. vol. 36, Issue 3, pp. 399-405. 2019.
Kristy Holtfreter. "Consumer Product Safety Act". Encyclopedia of White-Collar & Corporate Crime. SAGE Publications, Inc. <https://dx.doi.org/10.4135/9781412914260.n115>. 3 pages. 2005.
TAP Plastics. "Polycarbonate UV2 Sheets". (n.d.). Retrieved from <https://www.tapplastics.com/product/plastics/cut_to_size_plastic/polycarbonate_sheets/516> 13 pages. 2022.
Maria Prellwitz et al. "Usability of playgrounds for children with different abilities". Research Gate. Occupational Therapy International. vol. 14, Issue 3, pp. 144-155. 2007.
Karen Stagnitti. "Understanding play: The Implications for play assessment". Australian Occupational Therapy Journal, Australian Occupational Therapy Journal, vol. 51, Issue 1, pp. 3-12. 2004.
Karen Stagnitti et al. "The Importance of Pretend Play in Child Development: An Occupational Therapy Perspective". British Journal of Occupational Therapy. vol. 63, Issue 3, pp. 121-127. 2000.
Pooja Tomar. "Social inclusion of children with visual impairment". International Journal of Advanced Research, Ideas and Innovations in Technology, (IJARIIT). vol. 4, Issue 3, pp. 2092-2095. 2018.
U.S. CPSC. "Consumer Product Safety Improvement Act of 2008". 63 pages. 2008.

* cited by examiner

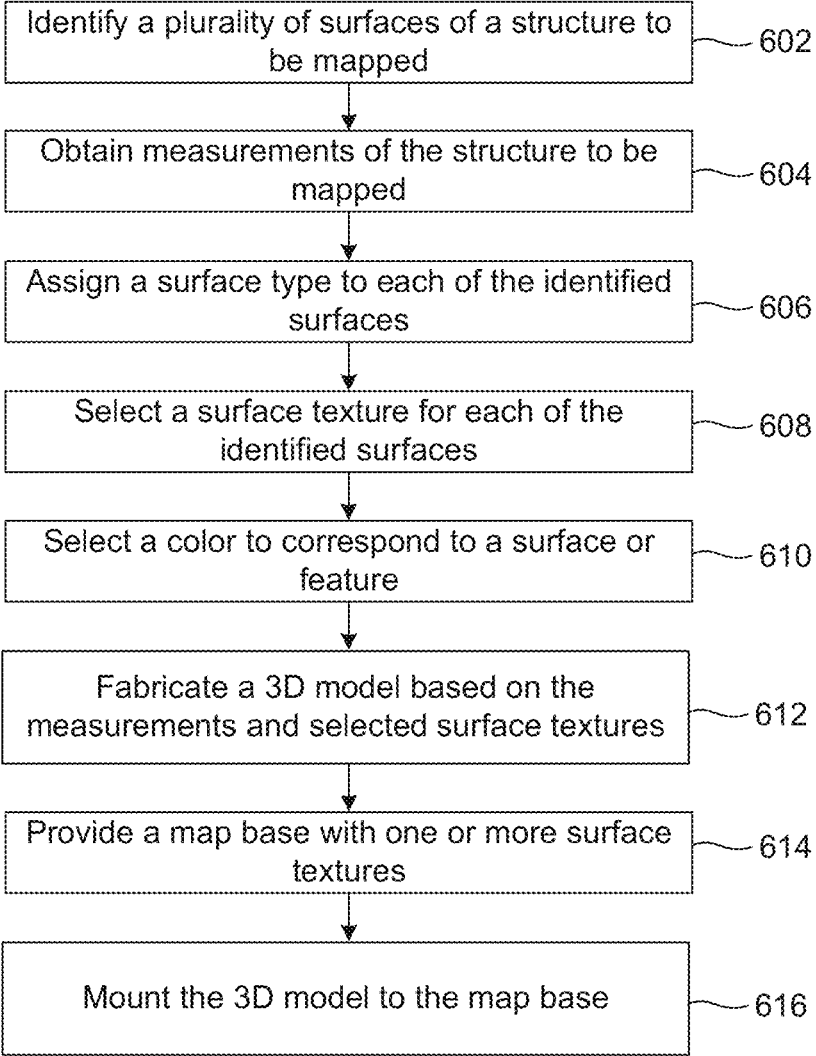

Identify a plurality of surfaces of a structure to be mapped — 602

Obtain measurements of the structure to be mapped — 604

Assign a surface type to each of the identified surfaces — 606

Select a surface texture for each of the identified surfaces — 608

Select a color to correspond to a surface or feature — 610

Fabricate a 3D model based on the measurements and selected surface textures — 612

Provide a map base with one or more surface textures — 614

Mount the 3D model to the map base — 616

*FIG. 6*

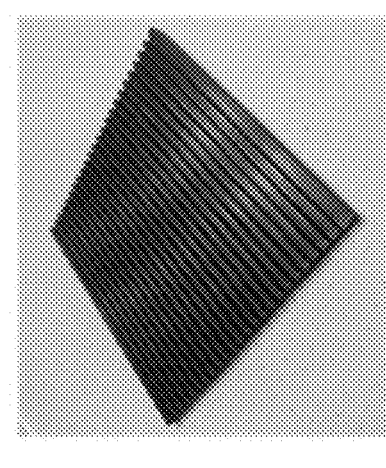
*FIG. 9C*
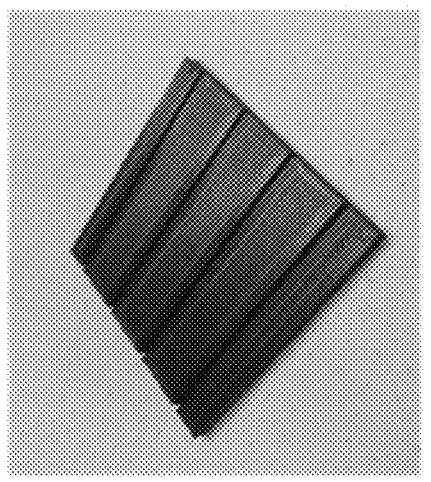
*FIG. 9B*
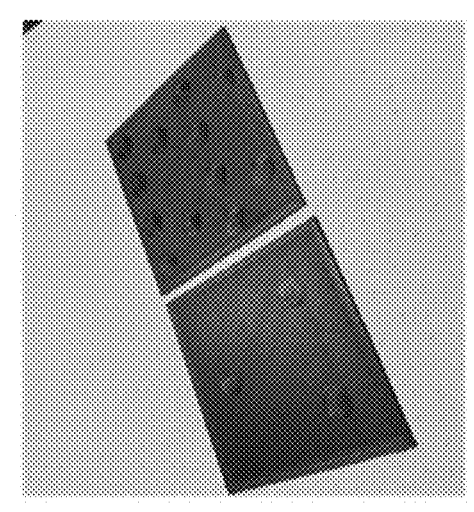
*FIG. 10B*
*FIG. 9A*
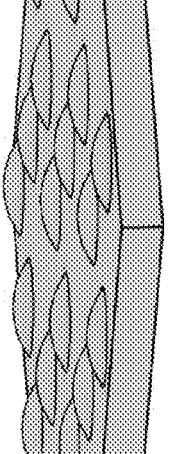
*FIG. 10A*

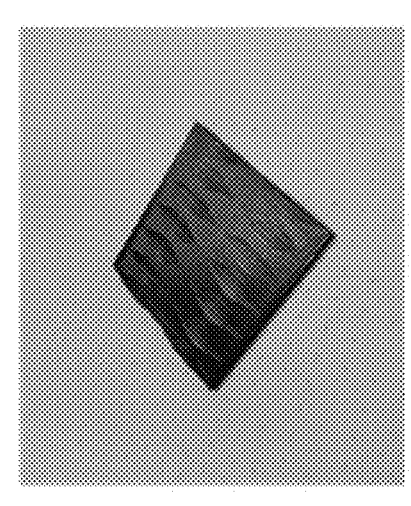
FIG. 13C
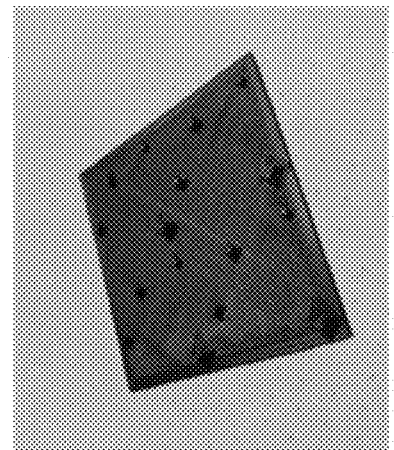
FIG. 14C
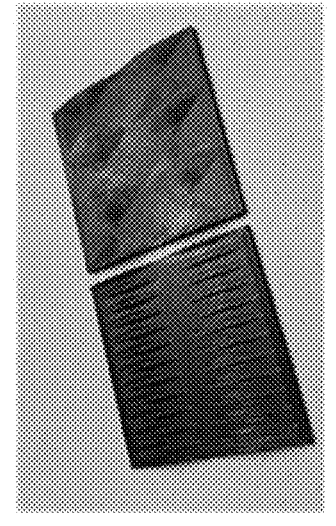
FIG. 13B
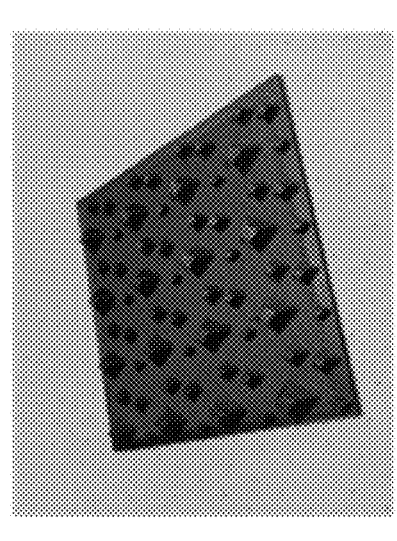
FIG. 14B
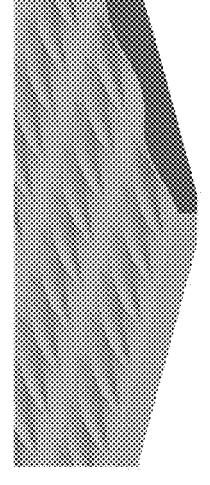
FIG. 13A
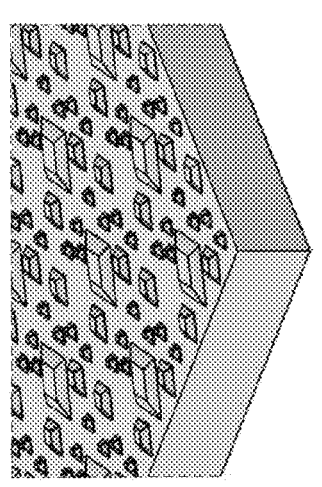
FIG. 14A

THREE-DIMENSIONAL TACTILE MAP SYSTEM

CROSS-REFERENCE TO RELATED APPLICATION

This application claims the benefit of and priority to U.S. Provisional Application No. 63/120,447, titled "3D TACTILE MAP FOR PEOPLE WHO ARE VISUALLY IMPAIRED AND BLIND," filed on Dec. 2, 2020, the entire contents of which are hereby incorporated herein by reference.

BACKGROUND

There are over 100,000 public playgrounds in the USA, all of which are required to comply with the Americans with Disabilities Act (ADA). Essentially, public playgrounds need (1) an accessible route for wheelchair access, (2) wheelchair accessible playground safety surfacing, and (3) children with disabilities should be able to access approximately 50% of the activities on the playground. The playground industry has indicated an increasing interest to make playgrounds inclusive to all children, including those with visual impairments or blindness, provide safer playgrounds with less risk of liability exposure, and create a more enjoyable experience for the children.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

FIG. 6 illustrates an example method of implementing a 3D tactile map according to various embodiments of the present disclosure.

FIGS. 9A-9C illustrate examples of concrete surface texture according to various embodiments of the present disclosure.

FIGS. 10A and 10B illustrate examples of gravel surface texture according to various embodiments of the present disclosure.

FIGS. 13A-13C illustrate examples of engineered wood fiber surface texture according to various embodiments of the present disclosure.

FIGS. 14A-14C illustrate examples of loose fill rubber surface texture according to various embodiments of the present disclosure.

DETAILED DESCRIPTION

Figure 1:
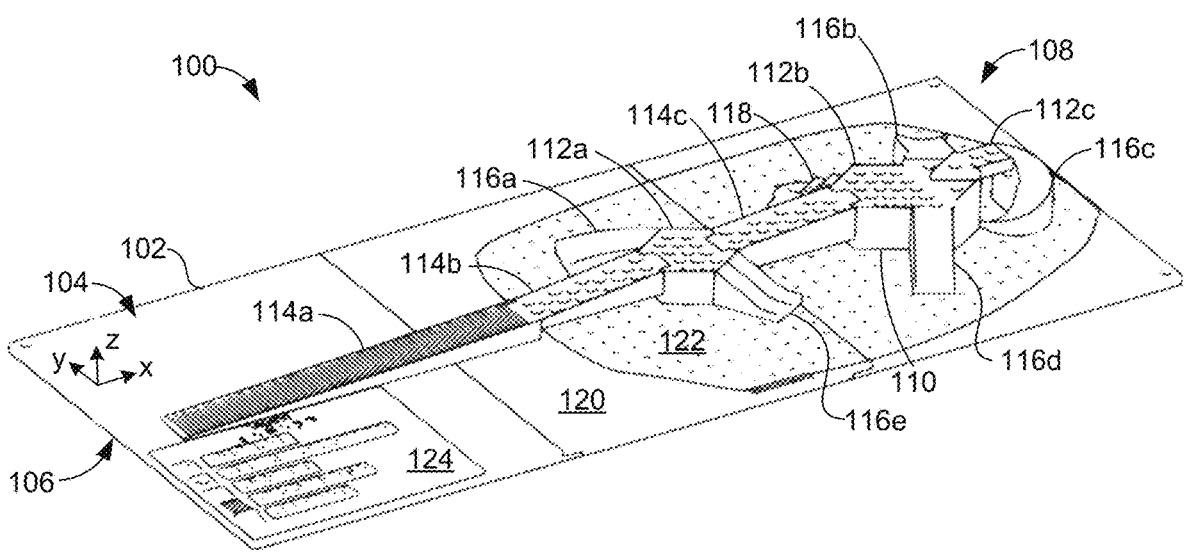
FIG. 1 illustrates an example of a 3D tactile map according to various embodiments of the present disclosure.

Play represents a crucial aspect of childhood development. Through play, children are able to develop physically and emotionally. Playgrounds and play areas are designed to encourage the physical, emotional, and social growth of children; however, in many cases, the design of playgrounds represents a significant barrier to this growth in children with disabilities. Visually impaired and blind (VI&B) children are generally less physically active than their nondisabled peers, putting them at a higher risk for future health related issues. Some studies have found that visually impaired and blind children also exhibit delays in language development. Language and communication development is accentuated in children who consistently play with their peers. Though playgrounds are now required to follow guidelines set forth in the American with Disabilities Act of 1990, there exists little research to facilitate accessible, inclusive play in playgrounds for VI&B children.

Approximately 2.4-4.6% of the US population is VI&B. There is a need to help make public playgrounds accessible to children who are visually impaired or blind, as well as adult caregivers who are visually impaired or blind. Additionally, minimizing injuries on playgrounds is paramount. An unfortunate corollary to the ubiquity of playgrounds is the rate of injury on public playgrounds. Accidents on public playgrounds send approximately 200,000 children to the emergency room every year in the USA—playground accidents are the second most common reason that kids go to the emergency room each year in the United States.

A 3D tactile map would help to address both these issues by (1) making playgrounds accessible and inclusive to people who are visually impaired and blind, and (2) by making it safer for this cohort to navigate playgrounds. While tactile maps are sometimes used to represent a larger space, the maps provide only a two-dimensional (2D) or top view of a layout. For example, a tactile map created from felt and cloth can be used to find rooms of a building. While this type of map can be useful for navigation, the concept of surfaces and height are not represented. By providing a 3D tactile map, the concept of height can be introduced to the VI&B user, which can be critical on playgrounds. For example, part of playing on a structure includes changing heights. A tactile map that can convey a height difference can provide a better model of the actual playground structure and a safety element allow the VI&B user to prepare for anticipated changes in height in play surfaces and distance to the ground.

In the context outlined above, various examples of three-dimensional tactile maps, tactile map systems, and methods of implementing a tactile map system for people who are visually impaired or blind are disclosed herein. The impetus for the systems and methods described herein came from the realization that public playgrounds are not optimal for children who are visually impaired and blind. Although the examples shown herein are directed to an example 3D tactile map system for a playground for visually impaired and blind students, the 3D tactile map system can be implemented for other playground structures or other areas with changing elevations that may be challenging for people who are visually impaired or blind to navigate. The 3D tactile map system can be configured with auditory elements to enhance understanding of the features by sounds or verbal explanation of components that are not clearly identifiable from a top or side view. For example, an activity panel on the side view of a map may be modeled as a flat surface because the minute detail may not be discernable by touch. An audio component on or near the feature could be used to further describe the type of activity on the side, such as tic-tac-toe, etc. Examples of a housing unit and support structure to shelter the 3D tactile map when implemented in an outdoor environment are also disclosed.

The 3D tactile map system can provide scale and orientation of identified surfaces of a structure, such as a playground structure. For example, the identified surfaces can be play surfaces, platforms, ramps, slides, or ground. As can be understood, other surfaces of a structure may be classified in a manner to distinguish the identified surface. As described herein, the 3D tactile map system for a playground for visually impaired and blind students provides for the scale and orientation of identified surfaces. The level of detail of the tactile map system can be considered "medium." For example, the tactile map system can include some detail to represent platforms, slides, faces to indicate activity panels, etc., but not include full detail of every single component on the playground in specific detail on the tactile map. Some examples can include a level of detail with more intricate detail. Some examples can include a level of detail with less detail than described, i.e., enough detail to provide only the location and general shape of various pieces of equipment.

For example, if the VI&B user doesn't understand the concept of height, the user may not understand the concept of falling from an elevated surface. Additionally, the 3D aspect of the map can allow the user to "feel" the "side view" of the playground to aid in understanding the overall structure. In some examples, the 3D tactile map can also provide a tactile indicator of features on the play structure that would not be possible to feel on a 2D linear/shape representation. For example, a composite playground structure, such as a big playhouse with activities at various levels, can have the activities represented in 3D and/or with auditory elements.

A 3D spatial map positioned at the entry to a playground would enable children who are visually impaired and blind to better navigate playgrounds. An example of a 3D tactile map system can include a 3D-printed tactile map representing a bird's-eye-view of the playground such that users can feel play activities associated with the top and side areas of equipment, as well as underneath the equipment if applicable. The 3D tactile map can also include audio components to vocalize play components that are not clearly identifiable from a top view. For example, a playground structure can have areas underneath elevated platforms where children can play at ground level (i.e. there are drums, store front panels, places to sit, etc. underneath the equipment). The 3D tactile map provides more than just the top view, with some side views identifiable through tactile means. For features such as activity panels, the auditory elements can be helpful. The 3D tactile map can also include a housing unit to protect the map and circuitry from physical damage and environmental factors, and to present the map at an angle, if necessary, and a structure to support all components. While the tactile map in the examples can be made using a 3D-printer, other methods of fabrication can be relied upon. For example, 3D tactile map can be milled, molded, or fabricated by another suitable process to represent the playground structure.

In some examples, the tactile map system can be a standalone structure with a single function, i.e. orient user to playground. The tactile map system can also be part of a broader structure to provide information regarding multiple functions on the playground, including a structure that can also orient non-visually impaired and blind people in terms of safety. For example, safety signage can be required on playgrounds. The tactile map system can also have additional features, for example with respect to brand. In an example, the stand can be expanded to an entryway that expresses the "soul of the community" through the playground via art in an area that can be updated (chalk sculpture, the name of the playground, etc.). In another example, the stand can serve as an inclusive playground kiosk and contain information on the features of the inclusive playground as well as a welcome statement typical of inclusive playgrounds.

Described below are various embodiments of the present 3D tactile map system for people who are visually impaired and blind, and methods of implementing a 3D tactile map system. Although particular embodiments are described, those embodiments are mere exemplary implementations of the system and method. One skilled in the art will recognize other embodiments are possible. All such embodiments are intended to fall within the scope of this disclosure. Moreover, all references cited herein are intended to be and are hereby incorporated by reference into this disclosure as if fully set forth herein. While the disclosure will now be described in reference to the above drawings, there is no intent to limit it to the embodiment or embodiments disclosed herein. On the contrary, the intent is to cover all alternatives, modifications and equivalents included within the spirit and scope of the disclosure.

In the following discussion, a general description of the systems of the present disclosure and their components is provided, followed by a discussion of the operation of the same. Various non-limiting examples of a 3D tactile map system are discussed.

Shown in FIG. 1 is an example of a three-dimensional (3D) tactile map 100 of a playground for people who are visually impaired or blind. The 3D tactile map 100 provides a scaled representation of an example playground. In this example, the tactile map 100 can include a map base 102 having a substantially planar substrate defining an x-y plane. In some examples, the map base 102 can include a plurality of planar substrates connected to each other to form the map base 102. The map base 102 can include a top base surface 104 and a bottom base surface 106. The bottom base surface 106 can be used for mounting the map base 102.

The 3D tactile map 100 also includes a three-dimensional (3D) scaled representation 108 of the structure to be mapped. The 3D scaled representation 108 can be configured with dimensions that are in proportion to the structure and extend in a z-direction from the map base 102 to represent height and the z-direction being orthogonal to the x-y plane. The 3D scaled representation 108 can be attached to the top surface 104 of the map base 102. In some examples, the 3D scaled representation 108 can be formed with the map base 102. In some examples, 3D scaled representation 108 can include a plurality of 3D objects representing playground components that are attached to each other and/or the map base to form the 3D scaled representation 108. Additionally, the 3D scaled representation 108 can have side surfaces 110 that extend downward toward the map base to represent the height of the individual surfaces with minimal detail.

For example, as shown in FIG. 1, the 3D scaled representation 108 of the example playground comprises platforms 112a-112c (collectively "platforms 112"), ramps 114a-114c (collectively "ramps 114"), slides 116a-116e (collectively "slides 116"), and stairs 118. In this example, platforms 112 represent a substantially level area, and ramps 114 represent an area with some inclination, with the angle of inclination being low. In this example, each of the slides 116 represent the play feature and are scaled to indicate the height, inclination, and curvature of the individual slide of the playground structure. The 3D scaled representation 108 can have measurements scaled by a ratio based on measurements of the structure to be mapped. For example, the map 100 to playground structure ratio can range from about 1:20 to about 1:50. It was found that a larger map (about 1:20) can be useful for younger users and smaller playgrounds. For a scale beyond 1:50, it is not practical to use because the representation becomes too small to distinguish detail by touch. In the example of FIG. 1, the scale on 3D tactile map 100 is about 1:40. As can be understood, when implemented with other playground structures, the number of platforms 112, ramps 114, and slides 116 can vary and/or include additional features not shown in the example of FIG. 1. As discussed above, the tactile map 100 can include some detail to represent platforms, slides, faces to indicate activity panels, etc. for orientation, but not include specific detail of every single component on the playground.

The 3D tactile map 100 can include a plurality of identified surfaces corresponding to the components of the playground or structure to be mapped. Each of the plurality of identified surfaces having a surface type of a plurality of surface types and each surface type corresponding to a selected surface texture. For example, the platforms 112, ramps 114, and slides 116 can each have a different surface texture to represent the respective playground component. In some examples, two or more of the same type of component can have a different surface texture. For example, as shown in FIG. 1 ramp 114b is a continuation of ramp 114a, but the ramps have different surface textures. Additionally, the top base surface 104 of the map base 102 can have one or more textures to represent the ground features. For example, the top base surface 104 can include a base surface texture 120. In some examples, the base surface texture 120 can include a ground surface texture or a texture different than the featured structure or area surrounding it. In some examples, a raised boundary can define the play area 122. As will be described in further detail, each of the surface textures can be selected to have distinguishing features to provide a contrast at a transition of adjacent surfaces. A legend 124 can be provided on or near the map base 102 to provide a key to the type of individual surface texture that is represented on the 3D tactile map 100. The legend 124 can provide a sample of the individual texture and a braille description of the texture or feature.

Figure 2:
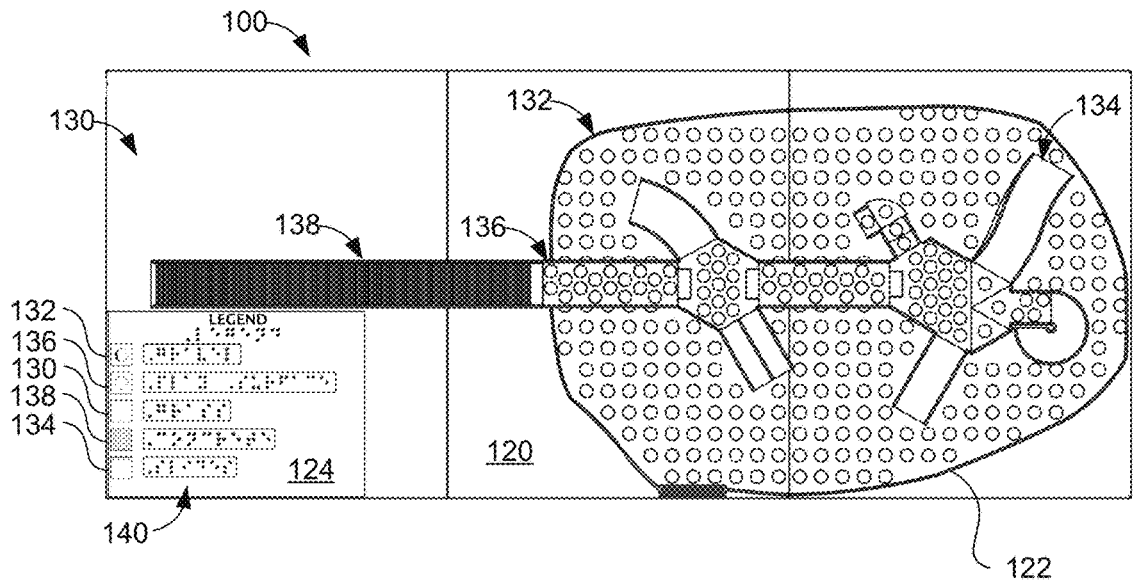
FIG. 2 illustrates an example of a top view of the 3D tactile map in FIG. 1 according to various embodiments of the present disclosure.

As shown in greater detail, FIG. 2 is a top view of the 3D tactile map 100 of FIG. 1. In this example, the map base 102 has two different surface textures to indicate boundary and surface type of the play area 122. For example, the top base surface 104 is shown with a grass surface texture 130 outside the boundary of the play area and with a gravel surface texture 132 inside the boundary of the play area. In this example, the gravel surface texture 132 in the play area is represented with raised dome-like circles. The slides 116 are also represented with a smooth slide surface texture 134, but are distinguishable from the ground having a solid raised feature and inclination. Each of the slides can be shaped to represent the corresponding slide on the playground and are scaled accordingly. In this example, platforms 112a, 112b, ramps 114b, 114c, and stairs 118 can be considered play surfaces and have the same play surface texture 136, but the solid 3D map representation of the individual playground components provide an indication of the elevation change. For example, a designated play surface can be defined as an area of at least 2 inches by 2 inches and within 30 degrees of horizontal. As shown in this example, ramp 114b is a continuation of ramp 114a, each with different surface textures. In this example, surface texture of ramp 114a represents a concrete surface texture 138 and surface texture of ramp 114b represents a play surface texture 136. In this example, ramp 114a is considered access to the playground structure, not a play surface.

The legend 124, shown in FIG. 2, is an example legend for this example 3D tactile map 100. In an example, a braille or raised text legend 124 can be used to identify the different surface textures. In an example, braille or raised text can be used to spell out the names of the identified surfaces or features, such as "slide," "deck," etc. The legend 124 can provide a sample of each surface texture 130-138 used in the 3D tactile map 100 and a braille or raised text description 140 of the texture or feature. For example, as shown in FIG. 2, the legend provides a sample surface texture and braille description of the gravel texture surface 132 having a raised semi-sphere or dome represents gravel; the play surface texture surface 136 having a circular indentation represents the play surface; the grass texture surface 130 having a smooth surface represents grass; the concrete texture surface 138 having grooves represents concrete; and slide texture surface 134 having an inclined smooth surface represents a slide. As can be understood, the example surfaces shown in this legend represent the surfaces as implemented in the example 3D tactile map of FIGS. 1 and 2. As such, one or more of the surface representations for the features could be replaced with a different surface texture to convey the information in a similar manner. For example, in this example the grass surface texture is indicated as smooth; however, in another example, the grass can be represented by a different pattern or raised surface. The legend for the alternate configuration would similarly convey the texture used for the grass. As will be described in further detail, each of the surface textures can be selected to have distinguishing features representative of the featured surfaces of the playground components.

Figure 3:
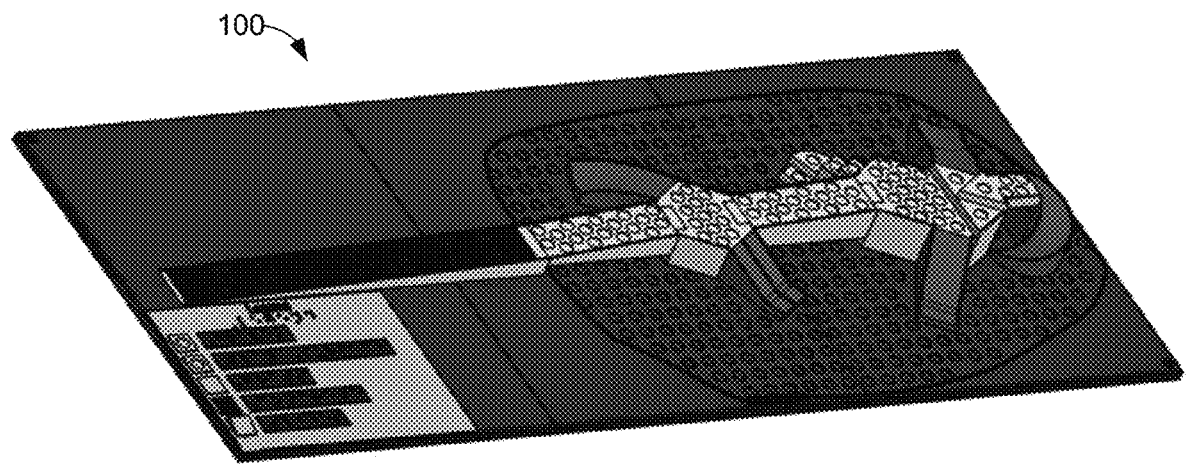
FIG. 3 illustrates an example of a color-coded view of the 3D tactile map in FIG. 1 according to various embodiments of the present disclosure.

As shown in FIG. 3, the 3D tactile map 100 can also include color to distinguish the features or components of the playground. Many people with partial blindness can detect bright colors and color contrasts. The tactile map 100 can also include a selected color for each surface type or feature. For example, the colors can be chosen to provide contrast among the plurality of identified surfaces so that the surface type can be readily determined. For example, high contrast colors such as red, yellow, and black can be chosen, but other selected colors may be equally effective to provide the most contrast for visually impaired children. Further, the texture-color combination for each surface type can make the surface type or purpose more easily identifiable. For example, the top surface of the map base may include a first color and a first texture, the play surface may include a second color and a second texture; and the slide surfaces may include a third color and a third texture. In some examples, the colors of the tactile map can match the actual playground colors. As shown in FIG. 3, ramps 114 are shown in yellow, slides 116 are shown in red, and the grass 130, gravel 132, and concrete ramp 138 shown in black. This non-limiting example illustrates three contrasting colors, however more or fewer colors can be used depending on the configuration of the playground and number of identifiable types of surfaces or features to be classified. The 3D scaled representation 108 and/or 3D tactile map 100 can be fabricated using a 3D printer, but other methods of fabrication can also be relied upon. For example, ABS plastic or other durable plastic can be used to 3D print the tactile map. In other examples, the 3D tactile map can be milled, molded, or fabricated by another suitable process to represent the playground structure. While the color-texture combinations shown and described provide an example of distinguishable surfaces, other unique color-texture combinations can be assigned to identified surfaces to signify different types of surfaces and play components.

Figure 4:
FIG. 4 illustrates an example playground which is represented by the 3D tactile map in FIG. 1 according to various embodiments of the present disclosure.

Shown in FIG. 4 is the example playground 10 which is represented by the 3D tactile map 100 in FIGS. 1-3. As discussed above, the 3D tactile map 100 for a playground for visually impaired and blind students provides for the scale and orientation of identified surfaces but may not include full detail of every single component on the playground. In the example of FIG. 1, the scale on 3D tactile map 100 is about 1:40, where the items on the map are 40x smaller than playground 10. As shown in FIG. 4, a playground 10 can include features not effectively represented in the simplified 3D tactile map 100. For example, playground 10 includes covered portions, railings, and other safety barriers which partially enclose the platforms and ramps; however, these features are not embodied in the scaled representation 108 in FIGS. 1-3. These additional physical features, while important for safety, would add unnecessary detail to the 3D tactile map 100. The scaled representation 108 is intended to represent designated play surfaces that a child might stand, balance, or play on. For example, a designated play surface can be defined as an area of at least 2 inches by 2 inches and within 30 degrees of horizontal. The roof on the playground is not designated or safe to play on, nor accessible to a child, thus are not represented. However, a play structure can also have additional play features on a side of or underneath the play structure. To fully describe these additional details or features, an audible component can be added for a 3D tactile map system 150 comprising the 3D tactile map 100.

In some examples, the tactile map system 150 can also include a tactile indicator 152 of a feature located on the structure. In an example, braille or raised text can be used to spell out the identified feature. In an example, the tactile indicator can be a button 152 to activate an audible indicator or description of the feature. In one example, a button or other tactile indicator can indicate a "you are here" position on the tactile map 100 to represent the distance and relationship of the tactile map system 150 to the playground 10. The tactile map system 150 can include an audio system configured to play a voice recorded description of at least one feature via speakers 154. The speakers can be mounted beneath the map mount 162 or at the rear of the housing unit or in another location within the housing unit 160. A tactile map system can include a button to activate a voice recorded description of at least one feature. The button 152 can be located on or near the feature of the structure. For example, the button 152 can be located the 3D representation 110 or on the map base 102 near the feature. The audio system of the tactile map system can include one or more of a controller, a microprocessor, a media player, a speaker, and a power source. While buttons are an example to activate audible indicators, other actuation devices such as switches or sensors can also be used to initiate play of the auditory elements.

For example, buttons can be placed on the tactile map to incorporate auditory elements to describe features of the play structure. For example, the auditory element can be a voice description or other sound representative of the feature. The buttons can indicate the location or feature of play equipment not represented on the tactile map. For example, the buttons can activate a voice description to indicate locations of the clock, alphabet, window, and tic-tac-toe on a side of or underneath the play structure. In another example, the buttons can activate a voice description to further provide context of a feature that is represented on the tactile map or make sense of the object being felt.

For example, the controller can be embodied in the form of hardware, firmware, software executable by hardware, or as any combination thereof. In one example, the controller can be embodied as a microcontroller, such as an Arduino® or Raspberry Pi® microcontroller. The controller can also include memory for storing instructions, including software-based computer-readable instructions. If embodied as hardware, the controller can be implemented as a collection of discrete analog, digital, or mixed analog and digital circuit components. The hardware can include one or more discrete logic circuits, microprocessors, microcontrollers, or digital signal processors (DSPs), application specific integrated circuits (ASICs), programmable logic devices (e.g., field-programmable gate array (FPGAs), or complex programmable logic devices (CPLDs)), among other types of processing circuitry.

For example, the power source can be a battery, a power unit storing energy from a solar cell, AC power, and the like. In one example, the controller and audio system can be powered by two solar cells capable of producing 5 W of power. For example, the solar cells can be connected to a SparkFun® Sunny Buddy connected to a microcontroller and 2000 mAh lithium polymer battery. For example, a conservative calculation of the power requirements of the circuit was found to require a maximum of 3.75 W and an expected current of 155 mAh resulting in at least 13 hours of continuous battery use without charging from the solar cells.

Figure 5:
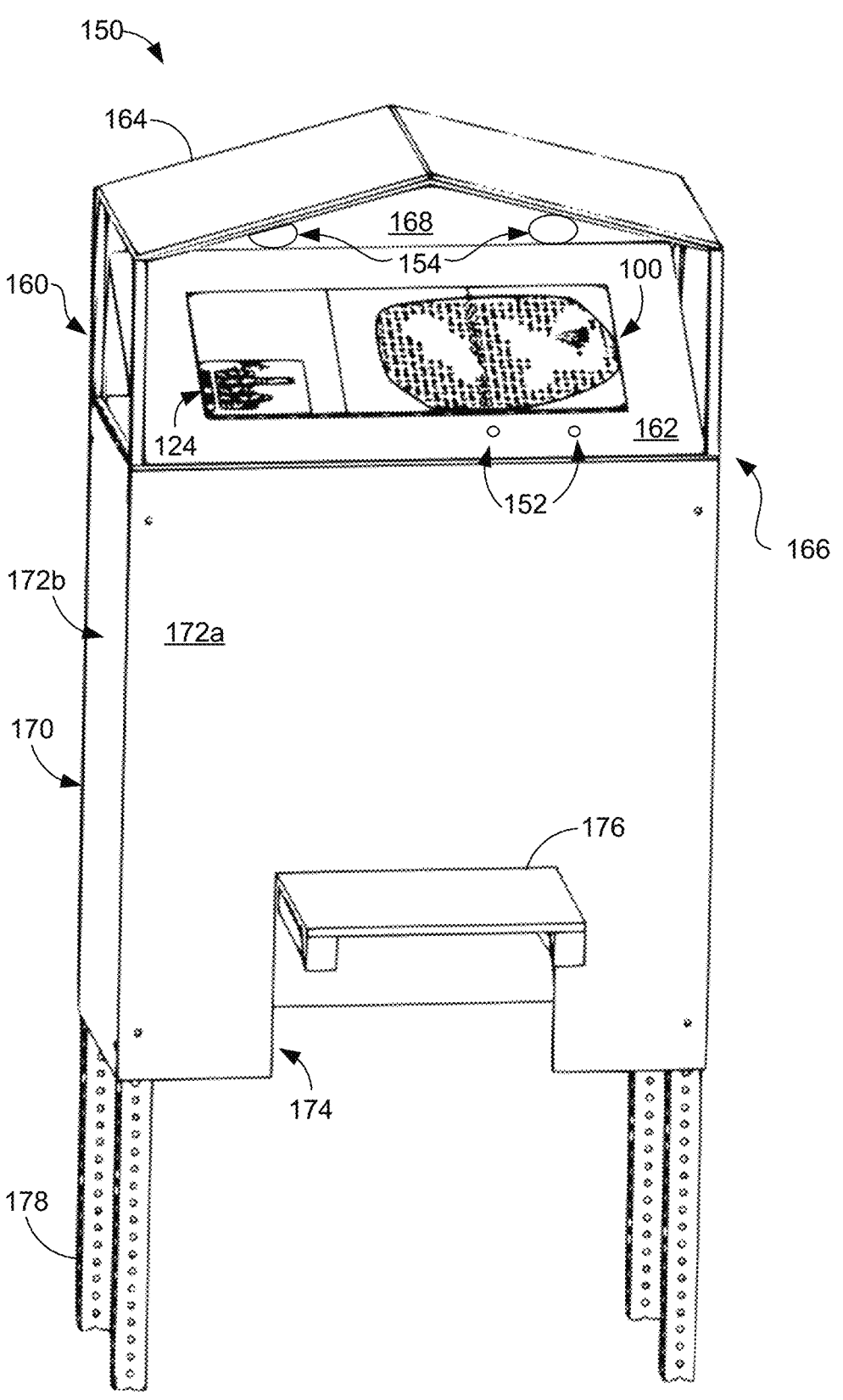
FIG. 5 illustrates an example housing unit and support structure for the 3D tactile map of FIG. 1 according to various embodiments of the present disclosure.

As shown in FIG. 5, the 3D tactile map system 150 can include a housing unit 160 suitable to mount the 3D tactile map 100 and enclose the audio system and other related components. The map base 102 can be attached to a map mount 162 inclined at an angle such that a front side of the 3D tactile map 100 is lower than a rear side of the 3D tactile map 100. For example, the map base 102 can be inclined at an angle up to 60°. In an example, the angle can range from about 30° to about 45°. In another example, the map base 102 can be positioned at 0° or parallel to a horizontal plane. It was determined that about 30° is a recommended angle to best comply with ADA standards.

In some examples, the housing unit 160 can include a roof 164 to cover the 3D map 100. In some examples, the roof 164 could be similar to the shape or design of a roof of a playground structure 10 or have a different theme. In the example shown in FIG. 5, the roof 164 can be pitched with an opening 166 on a side facing the mounted 3D map 100. In another example, the housing 160 can include a gable that extends downward to partially enclose the opening which allows access to the 3D map 100 to complete a closure if a door is installed. It was found that the gable would sometimes be an obstacle for a VI&B student to bump their head as they used the map, thus open-faced roof design may be preferred. In an example, the housing unit can include walls or vertical surfaces made of clear polycarbonate sheets, wood, fiberboard, composite material, plastics, metal, or other solid material. The roof can be fabricated from PVC corrugated roof panels, composites, plywood framework, and the like. In some examples, the roof 164 can be omitted.

The housing 160 can be configured to with one or more doors (not shown) to allow access to the 3D tactile map 100. In an example, the housing can be provided with a door that opens downward. In an example, the housing can be provided with two doors that open outward to the side. The one or more doors can be configured with a hinge to provide greater than 90° swing of the door, such that the door can be locked in position at the side of the housing 160. The housing 160 can include a means to hold the one or more doors open, such as a latch, magnets, and the like. In some examples, the doors can be omitted. In a preferred example, the map base 102 can be inclined at an angle of about 30° with clear sides to enable viewing from the front, left, and right. In some examples, the electronics can also be left visible under the map mount 162. The back wall 168 of the housing unit 160 can also be equipped with a hinged access door (not shown) to provide access for maintenance of the electronics for the audio system.

A support structure 170 can be included to support the housing 160 and 3D tactile map 100 at a predetermined height. For example, the height of the 3D tactile map 100 can be set between 32 to 48 inches. The support structure 170 can include a plurality of walls or vertical surfaces 172a-172d configured extend downward from a perimeter of the housing 160 or the map base 102, such that a VI&B child with a cane can accurately determine the location of the map without bumping into it. In an example, the back vertical surface 172c can include a hinged portion or the entire surface can be hinged to allow access to a storage space within the support structure 170 and beneath the housing unit 160. In an example, one surface of the plurality of vertical surfaces can be the front surface 172a corresponding to a front orientation of the 3D tactile map 100 mounted on the map mount 162. The front surface 172a can include a cut-out portion 174 to store a stool 176. In an example, the stool can be separate and positioned when needed. In an example, the stool can be integrated or secured to the support structure. The stool can be configured to fold out or extend when needed, where the legs and platform can fold to remain flush with the front face when not in use. Further, galvanized poles 178 can extend from the support structure and cemented into the ground to ensure stability of the structure.

The 3D tactile map system 150 can also include means for cane storage (not shown) in the one or more vertical surfaces 172, where a child could place a cane prior to accessing the playground. Generally, canes are not allowed on the playground for safety reasons. The means for cane storage would allow a child to place a cane in an indentation, such that the cane "stands up" at an angle and the handle of the cane would fit into the indentation. A plurality of indentations can be configured to hold a plurality of canes. For example, a side vertical surface 172b can be corrugated or have wave-like indentations configured to accommodate six canes without anything sticking out of the sides of the support structure that might poke, impale, or scrape a child. The means for cane storage can also be configured within a wall that comprises the vertical surface.

The 3D tactile map system 150 is intended to provide a solution that is fully accessible, meeting ADA accessibility standards. For example, the lowest edge of design is flush with the ground. This complies with ADA standard 307.3 for post mounted objects, which indicates that where a sign or other obstruction is mounted between posts or pylons and the clear distance between the posts or pylons is greater than 12 inches (305 mm), the lowest edge of such sign or obstruction shall be 27 inches (685 mm) maximum or 80 inches (2030 mm) minimum above the finish floor or ground.

The reach ranges can also be considered using ADA standards 308.1, 308.2, 308.3, which provide for the maximum and minimum above the finish floor or ground. For example, the forward or side reach for children should also be considered. For ages 3 to 4, the high maximum is 36 inches (915 mm) and low minimum is 20 inches (510 mm). For ages 5 through 8, the high maximum is 40 inches (1015 mm) and low minimum is 18 inches (455 mm). For ages 9 through 12, the high maximum is 44 inches (1120 mm) and low minimum is 16 inches (405 mm).

Additionally, where a forward reach is unobstructed, the high forward reach shall be 48 inches (1220 mm) maximum and the low forward reach shall be 15 inches (380 mm) minimum above the finish floor or ground. Similarly, where a clear floor or ground space allows a parallel approach to an element and the side reach is unobstructed, the high side reach shall be 48 inches (1220 mm) maximum and the low side reach shall be 15 inches (380 mm) minimum above the finish floor or ground. Further, where a clear floor or ground space allows a parallel approach to an element and the high side reach is over an obstruction, the height of the obstruction shall be 34 inches (865 mm) maximum and the depth of the obstruction shall be 24 inches (610 mm) maximum. The high side reach shall be 48 inches (1220 mm) maximum for a reach depth of 10 inches (255 mm) maximum. Where the reach depth exceeds 10 inches (255 mm), the high side reach shall be 46 inches (1170 mm) maximum for a reach depth of 24 inches (610 mm) maximum. For the example shown in FIG. 5, the width of the map can be 20 inches with a low reach of 34 inches and the high reach of 46 inches.

The legend 124 should also comply with ADA standards 703.2, 703.3, and 703.4. For example, the raised characters shall comply with 703.2 and shall be duplicated in braille complying with 703.3. Raised characters shall be installed in accordance with 703.4. The raised characters shall be ¹⁄₃₂ inch (0.8 mm) minimum above their background. The characters shall be uppercase. The characters shall be sans serif. Characters shall not be italic, oblique, script, highly decorative, or of other unusual forms. Character height measured vertically from the baseline of the character shall be ⅝ inch (16 mm) minimum and 2 inches (51 mm) maximum based on the height of the uppercase letter "I". Where characters have rectangular cross sections, spacing between individual raised characters shall be ⅛ inch (3.2 mm) minimum and 4 times the raised character stroke width maximum. Where characters have other cross sections, spacing between individual raised characters shall be ¹⁄₁₆ inch (1.6 mm) minimum and 4 times the raised character stroke width maximum at the base of the cross sections, and ⅛ inch (3.2 mm) minimum and 4 times the raised character stroke width maximum at the top of the cross sections. Characters shall be separated from raised borders and decorative elements ⅜ inch (9.5 mm) minimum.

Additionally, any braille should also comply with ADA standards 703.3 and 703.4. Braille dots shall have a domed or rounded shape and shall comply with Table 703.3.1. The indication of an uppercase letter or letters shall only be used before the first word of sentences, proper nouns and names, individual letters of the alphabet, initials, and acronyms. Braille shall be positioned below the corresponding text. If text is multi-lined, braille shall be placed below the entire text. Braille shall be separated ⅜ inch (9.5 mm) minimum from any other tactile characters and ⅜ inch (9.5 mm) minimum from raised borders and decorative elements.

As shown in FIG. 6, a method can be implemented to create a 3D tactile map for a playground or other area with changes in elevation. At box 602, to implement a three-dimensional (3D) tactile map system, a method can include identifying a plurality of surfaces of a structure to be mapped. At box 604, the method also can include obtaining measurements of the structure. The measurements can include measurements of each of the plurality of identified surfaces and spatial measurements to position the plurality of identified surfaces relative to a plane of a three-dimensional (3D) coordinate system. At box 606, the method can include assigning a surface type for each of the plurality of identified surfaces. At box 608, the method also includes selecting a surface texture to correspond with each surface type, each surface texture having a distinguishing tactile feature. At box 610, the method can include selecting a surface color to correspond with each assigned surface type or a feature. At box 612, the method can include fabricating a three-dimensional (3D) model based on a scaled ratio of the measurements obtained and the selected surface texture corresponding to the surface type for each of the plurality of identified surfaces. At box 614, the method can include providing a map base with one or more textures. The method can include assigning a surface type to the top surface of the map base. The map base can have a substantially planar substrate and can include a top surface and a bottom surface. At box 616, the method can include mounting the 3D model to a map base. The 3D model can be positioned on and attached to the top surface. As can be understood, certain features and elements can be added or omitted to the example method or performed in an alternate order.

The method can also include: identifying a feature of the structure; identifying at least one of: a location of the feature on the structure and a relative location with respect to an identified surface of the plurality of identified surfaces; and recording a description of the feature may include characteristics of the feature. The feature can be one of a plurality of features of the structure and a description of each of the plurality of features of the structure can be recorded. The method can include installing a tactile indicator of the feature on at least one of: the 3D model and the map base. The tactile indicator of the feature can include a means to play a voice recorded description of the feature.

The method can include constructing a housing configured to enclose the 3D model mounted on the map base. The map base can be oriented with the bottom surface parallel to a horizontal plane or positioned at an angle with respect to a horizonal plane. The housing can be further configured to accommodate an audio system including a controller and speakers. The audio system can be configured to play a voice recorded description of at least one feature of the structure. The housing can include a roof.

The method can include constructing a support structure to be configured to hold the housing containing the 3D model mounted on the map base. The support structure can include a plurality of vertical surfaces configured extend downward from a perimeter of the map base. One surface of the plurality of vertical surfaces can be configured to be the front surface corresponding to a front orientation of the 3D model mounted on the map base. The support structure can also include branding information, safety information, an inclusive playground welcome statement, playground rules, and the like. For example, this information can be written, provided in braille or raised text, or audible via the audio system. For example, the tactile map system can have a button that welcomes one to the playground and contains a general overview of playground rules, playground layout, etc. The method can include installing the tactile map system at the entrance of a playground and oriented such that the 3D model corresponds with the orientation of the actual playground structure.

Figure 7A:
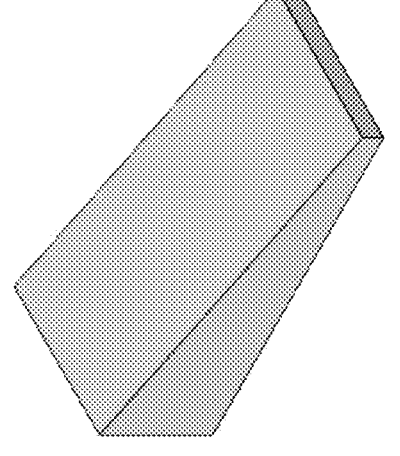

FIGS. 7A-16C further illustrate non-limiting examples of surface textures that can be selected for each of the identified surfaces or features of box 608. While several example surface textures and variations are shown, other surface textures can be relied on or selected for identification by touch. The surface textures are intended to represent the actual material or texture of the feature. For example, as representation of a slide is shown in FIG. 7A. While the surface texture is smooth, the shape and degree of elevation change can be modeled in three dimensions. The slide can also include waves, bumps, or turns that are scaled representations of the actual slide surface. FIG. 7B shows an example 3D printed slide. Since the edges of the slide can be sharp to the touch, it was determined that the edges of the slides can be sanded to make smoother for the installed 3D tactile map.

Figure 8C:
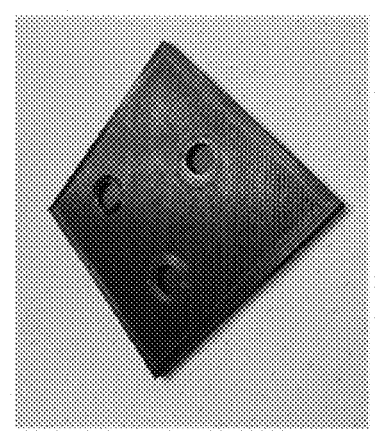
FIGS. 8A-8C illustrate examples of structural platform play surface texture according to various embodiments of the present disclosure.
Figure 7B:
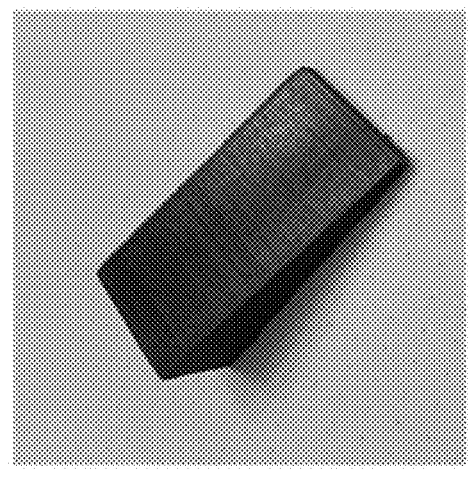
FIGS. 7A and 7B illustrate examples of slides with smooth texture according to various embodiments of the present disclosure.
Figure 8B:
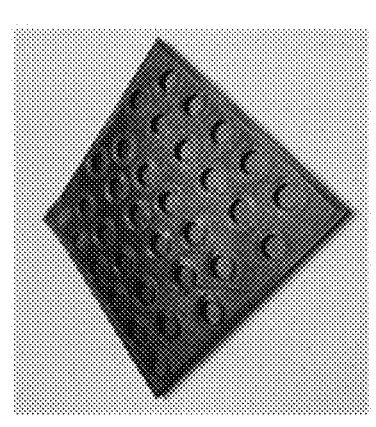
Figure 8A:
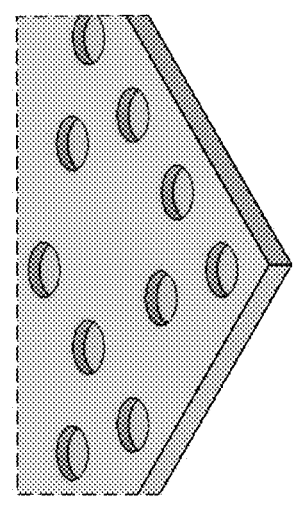

An example the play surface can be represented by circular indentations, as shown in FIG. 8A. The circular indentations can be similar to platforms and play surfaces used in an actual playground. As shown in FIG. 8B, a high frequency of circular indentations can be use to replicate the pattern of the platform; however, it was found that children were hindered in trying to feel their way through densely-packed symbols. Instead, loosely spaced, low frequency patterns to facilitate quick, easy map interpretation was more effective, as shown in FIG. 8C.

As shown in FIG. 9A, concrete can be represented by as indented lines, which is similar to scored concrete. A 3D representation is shown in FIG. 9B. However, it was found that the grooves can be hard to feel. A modified texture to represent concrete is shown in FIG. 9C. The modified concrete structure has wider grooves with greater frequency.

In an example, raised semi-spheres can represent a gravel surface, as shown in FIG. 10A. The frequency of the semi-spheres can be varied as shown in FIG. 10B.

Figures 11A, 11B, 11C, 12A, 12B, 12C:
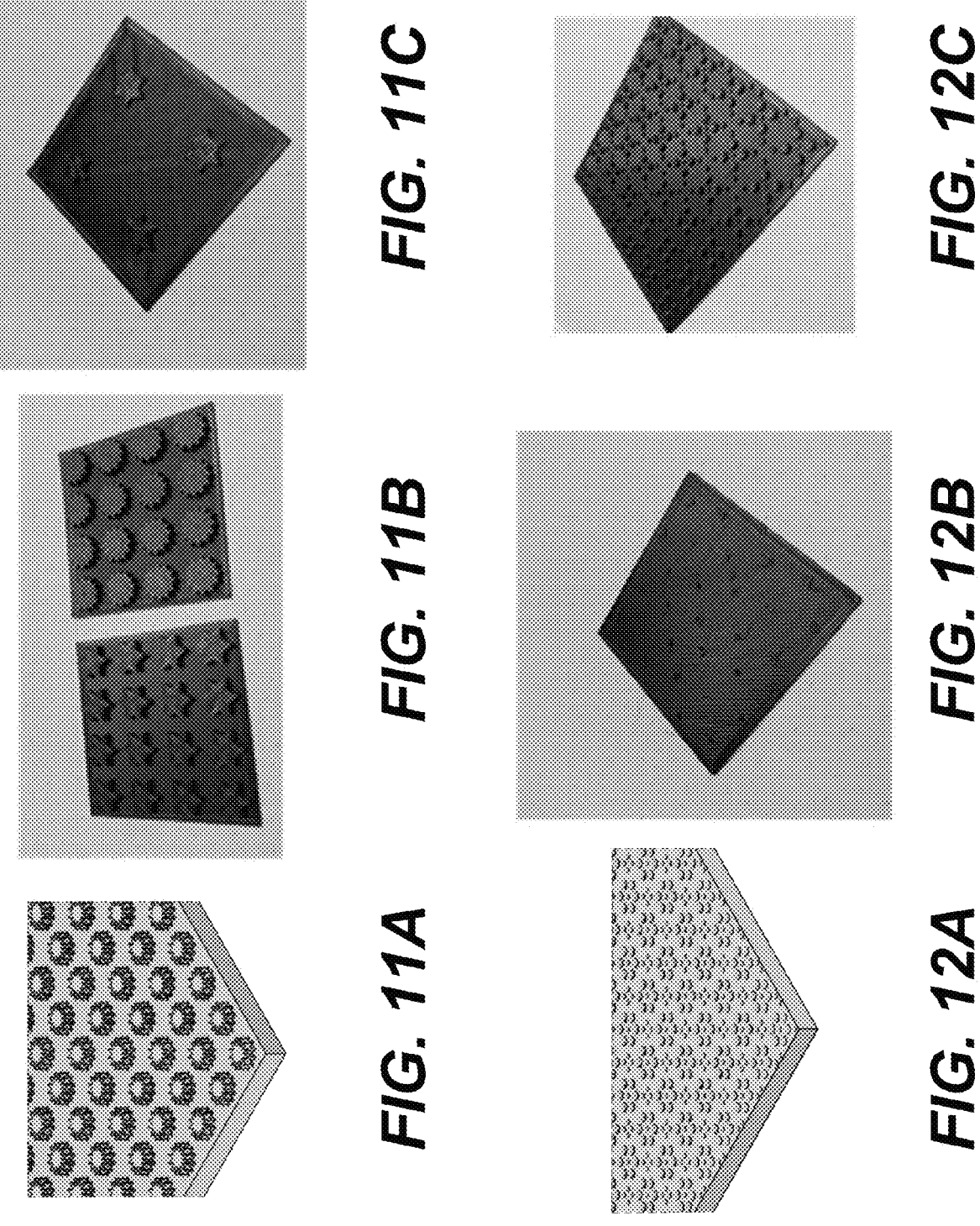
FIGS. 11A-11C illustrate examples of grass surface texture according to various embodiments of the present disclosure.
FIGS. 12A-12C illustrate examples of sand surface texture according to various embodiments of the present disclosure.

In FIG. 11A, an example surface texture to represent grass is shown, with multipoint stars representing tufts of grass. Two examples are shown in FIG. 11B with a different number of points on the stars in each example. When tested, it was determined that the edges or points of the stars can be sharp and the star pattern was too frequent. A modified grass texture with a six-pointed star shape that is less frequently spaced and edges smoothed is shown in FIG. 11C.

For an example sand surface, a pattern of small domes or raised semi-spheres of more than one size can represent sand and a gritty feel. In the example shown in FIG. 12A, about six slightly larger domes can surround smaller domes with additional smaller domes dispersed in the pattern. In FIG.

12B, a more irregular and spaced pattern can provide a gritty feel. FIG. 12C shows a simplified version of FIG. 12A. As can be understood, the size and frequency of the spacing can be varied or configured with a different pattern and still convey the gritty feeling of sand.

Engineered wood fiber (EWF) resembling mulch can be used as a safety feature under a playground used for attenuation in case of a fall. As shown in FIG. 13A, the compressed EWF surface can be represented by a woven pattern with raised elongated pointed oval shape. FIG. 13B, shows 3D prints of the pattern with different frequencies of the shapes. In testing, it was determined that the increased frequency (left) was too sharp and the decreased frequency (right) was too similar to a gravel texture. A modified surface texture with rows of raised elongated pointed oval shapes, as shown in FIG. 13C, was found to have a texture distinguishable from gravel.

Another possible playground safety surface is loose fill rubber or recycled tire, which is designed to attenuate impact energy in case of a fall. This material can be fibrous pieces or individual shards of rubber, sometimes shaped as cubes or prisms. As shown in FIG. 14A, this can be represented with a surface texture of various sized raised diamonds. The 3D printed version, shown in FIG. 14B, was found to be too sharp and the frequency of raised shapes too high, taking too much time to interpret. In FIG. 14C, an example of a modified version of the loose fill rubber surface texture is shown having a lower frequency of the raised shapes.

Figure 15C:
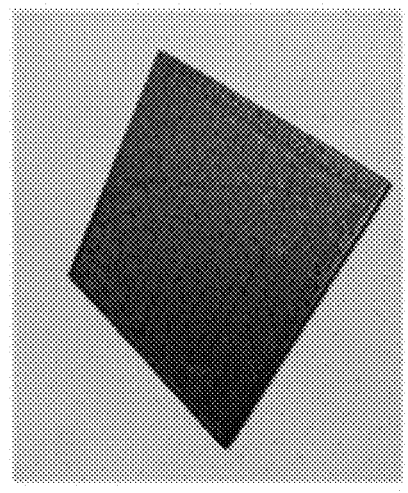
FIGS. 15A-15C illustrate examples of a synthetic rubber surface texture according to various embodiments of the present disclosure.
Figure 15B:
Figure 16B:
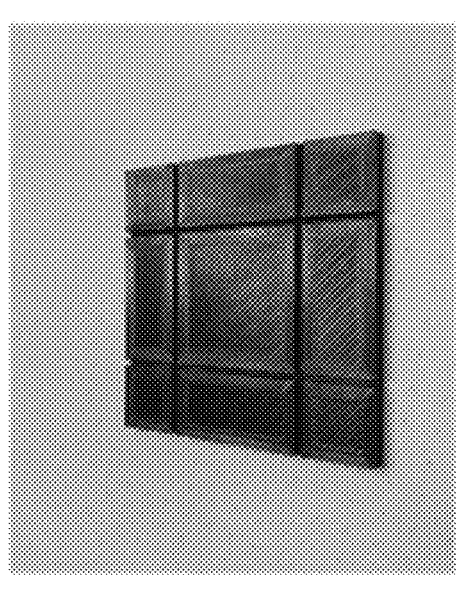
Figure 15A:
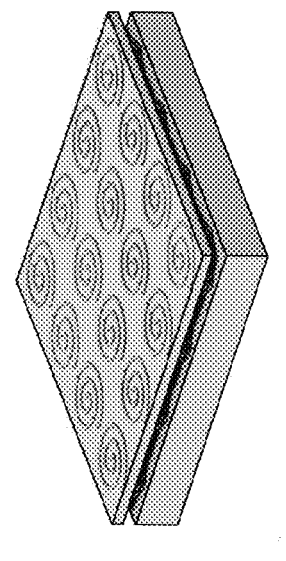

Another material used for safety under a playground can include a synthetic rubber wear layer over an impact attenuation layer, which provides a springy feel when walking on the surface. The synthetic rubber can be poured-in-place or some other form of Unitary Surfacing Material (USM). The synthetic rubber surface can include a multiplicity of synthetic rubber shards, interwoven, or formed together. For example, the synthetic rubber layer can be an EPDM (ethylene propylene diene monomer rubber) layer, or another synthetic rubber. As shown in FIG. 15A, the representative surface might include a raised spiral pattern to represent springs and/or a surface section raised by springs to simulate the feel when walking. FIG. 15B shows an example of a 3D printed spring, which is not the most feasible option. As shown in FIG. 15C, it was found that a modified surface texture similar to a sand option (FIG. 12B), but with increased frequency, felt more like the synthetic rubber surface of interwoven shards of material in the wear layer.

Figure 16C:
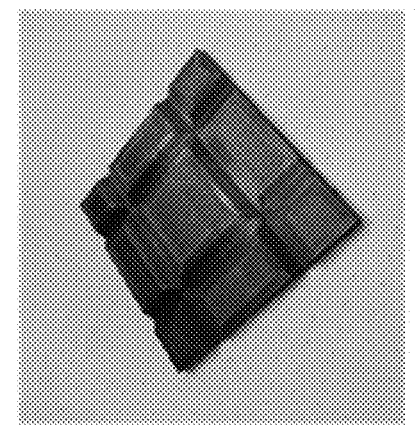
FIGS. 16A-16C illustrate examples of rubber tile surface texture according to various embodiments of the present disclosure.
Figure 16A:
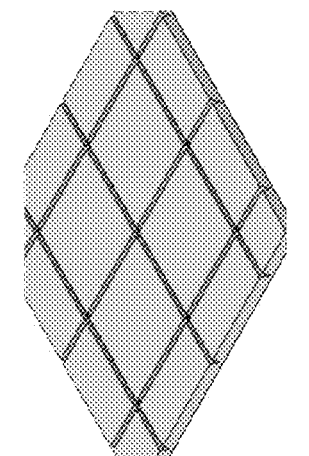

FIG. 16A shows a texture surface with grid-like groove indentions to represent rubber tile as another safety play surface. While the 3D printed version, shown in FIG. 16B, visually resembles a tile surface, it was determined that the indentations were difficult to feel. A modified surface texture for rubber tile can include beveled edges for the grid-like grooves to more easily distinguish the pattern by touch, as shown in FIG. 16C.

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

EXAMPLE 1

In order to gain knowledge and insight on how children with visual impairments approach play, interviews were previously conducted at two local institutions, McMains Children's Development Center and Louisiana School for the Visually Impaired (LSVI). An Institutional Review Board (IRB) granted the approval to interview twenty subjects including VI&B children, their parents, and faculty, broken up as follows: children (n=13), parents (n=5), faculty/teachers (n=2). Interviews with children were performed with a parent or faculty member present to promote a receptive environment and to follow safety qualifications of the IRB. Several themes emerged after qualitative content analysis of the transcripts. (1) Like most children, those with visual impairments love to explore new places, although they may struggle to adapt to new environments. (2) Many children with partial blindness use the limited vision that they have and can detect bright colors. (3) Many children were expressive of how an experience felt, further emphasized by faculty and staff. This may indicate a need to stimulate other senses. (4) Many adults expressed the need for safe play spaces.

In this example, the tactile map was 3D printed using ABS plastic. The plastic was chosen because curing increases the durability and life span of the tactile map. The example tactile map included three different textures. The first texture was an umbonate-like texture to represent gravel on the playground. The second texture was an indented texture to represent the platforms. The third texture was a smooth texture to represent slides. Only three textures were used based on feedback by LSVI to maintain simplicity. In this example, the colors of the tactile map included a black surfacing, yellow platforms, and red slides. These colors were suggested by LSVI faculty members due to the effectiveness of these colors in enabling VI students to distinguish among them.

The tactile map was sheltered in the designed housing unit. The purpose of placing the 3D printed map inside the housing unit was to shelter the 3D printed map from the elements such as wind, rain, and UV exposure. In this example, the housing unit included three clear polycarbonate sheets and one sheet of wood. The three polycarbonate sheets had a double layer of UV protectant in order to help protect the tactile map. One wood sheet served as a backing of the housing unit. The wood sheet was implemented to cover the circuitry element located in the back of unit for aesthetic reasons. The housing unit included a roof on top of the four walls. The roof resembled the roof used on a composite structure of a playground. The housing unit was be slightly larger than the 3D printed map in order for the map to properly rest inside the unit at a 30° angle.

The housing unit in this example included a double door design located at the front of the enclosure. This double door design allowed for a fully open front reading area of the tactile map for the students of LSVI. Each door had a stainless-steel doorknob that to allow for easy access to the tactile map located inside. While a doorknob was used in this example, other handles or pulls can be relied on to facilitate access to the tactile map. For example, ADA compliant handles, pulls, latches, and the like can be used to facilitate opening the door.

Each door also had stainless steel hinges to allow the doors to rotate 270 degrees around to the side of the enclosure. The doors were held open in this orientation by the attraction forces induced by ceramic magnets and the metal door knobs. Having the doors snap to the sides of the enclosure in this fashion, rather than allowing the doors to open only 90 degrees, reduces the hazard of students accidentally bumping into the doors. To ensure the doors stay closed, a double roller catch mechanism for each door, similar to cabinets, can lock the door in place.

The roof of the example housing unit was a pyramid style roof made from PVC Corrugated roofing panels. This roof included four triangles sealed along the edges making one cohesive structure. The roof had a slight overhang on the housing unit. The roof was configured to direct rain off of the structure to prevent water or other damage to the 3D tactile map while ensuring that children do not mistakenly hit the edges of the structure when using a cane. The roof also allowed for shading of the 3D tactile map to help keep the temperature of the housing unit lower. The pyramid design also allowed for more options to place solar cells. Solar cells were placed on the side of the roof that received the most direct sunlight. The pyramid roof structure allowed for four total sides to place the solar cells versus just two sides in a regular triangle roof. The roof also provided an aesthetic appeal to the housing structure because resembled the roofing used on the playground.

The housing unit rested on a support structure, which included four galvanized poles. In this example, the poles were 8' long, with 3.5' of the poles cemented into the ground to ensure stability of the structure. The poles allowed for the height of the housing unit to rest between 32"-48" from the ground. This height range is within a set of standards for heights for state park maps that are ADA compliant. The area under the housing unit was enclosed using plywood, dimensioned at ⅝"×6"×10', to ensure the safety of the students by preventing hazards such as the younger students bumping their heads or bodies on the bottom of the housing unit. There was a cutout in the enclosed area to house a stepping stool. The stool allowed for the younger/shorter children to have access to the tactile map and enjoy its benefits. The stool elements were recommended by some of the staff members because the students at LSVI use stools at water fountains throughout campus, making it an easy and familiar tool for them to use.

Auditory elements were included in the tactile map to signify various activities on the playground that cannot be fully understood by touch. The community partners at LSVI were most enthusiastic about this function to allow students to exercise non-visual senses. For example, the auditory elements consisted of electrical components including push-buttons, speakers, media players, and a microcontroller. For example, the micro controller can be an Arduino UNO Rev3. The buttons and speakers were placed on or in the relative areas the activities are located on the playground. This approach was to ensure that the students were aware of the location of these activities as they interacted with the tactile map.

In this example, the circuit was powered by two solar cells capable of producing 5 W of power. For example, the solar cells were connected to a SparkFun Sunny Buddy connected to a microcontroller and 2000 mAh lithium polymer battery. A conservative calculation of the power requirements of the circuit was found to require a maximum of 3.75 W and an expected current of 155 mAh. Therefore, with conservative calculations, the battery was expected to provide at least 13 hours of continuous use without charging from the solar cells.

The final dimensions of the 3D printed tactile map measured 24 inches in length, 15 inches in width, and with a total height of 2 inches. The base thickness measured 0.5 inches of the total height and the scaled tactile playground structure measured up to 1.5 inches. In this example, the map base rested at a 30° angle within the space created between the polycarbonate sheets to facilitate ease of access and increased ability to read the map.

The total height of the tactile map system was dependent on the final height of the support structure which can range between 32 to 48 inches. The wooden enclosure of the support structure had a cutout for the stool with dimensions of 13 inches by 16 inches. The housing unit had a length of 27.5 inches, a width of 14.5 inches, and a height of 11 inches. These dimensions were found through trigonometry of the map at a 30° and adding extra space so the map can comfortably reside in the space. Finally, the roof had a height of 6 inches and loft down to extend 0.75 inches in each direction from the housing unit. The roof was configured to facilitate drainage of water off the housing unit and act as a shading mechanism to keep the enclosure cool.

EXAMPLE 2

The design of the tactile map aims to incorporate the concept of height, an integral portion of a playground design. Thus, students can use the tactile map to familiarize themselves with their orientation on the playground and become comfortable with their sense of height off the ground. An example of a tactile map was designed with three color-texture combinations that would promote tactile and visual stimulation for the students. The non-limiting example design included circular indentations printed in yellow to replicate the play surfaces, raised semi-spheres printed in black to represent the gravel surrounding the playground, and a smooth red texture to emulate the surface of the slides.

Auditory elements were included in the tactile map to vocalize features of various activities on the playground structure that cannot be seen from a bird's-eye-view. The auditory elements included electrical components such as push-buttons, speakers, a mini amplifier, and a controller. In this example, the controller was a Raspberry Pi 3 B+ microprocessor. The circuit was powered, for example, by two solar cells capable of producing 5 W of power. This was done by connecting the solar cells into a power platform which were connected to the microprocessor and 1870 mAh lithium polymer battery. For example, the power platform in this example was a PiJuice Hat with a RTC (real-time clock) installed which allowed the microprocessor to be turned on/off automatically at designated times of the day. While solar cells are provided as an example power source, other power sources can be relied on for circuitry and auditory elements. For example, one or more batteries can be used or AC power from a standard outlet. While push-buttons were used an example, other actuation devices such as switches or sensors can also be used to initiate play of the auditory elements.

The tactile map, as well as the circuitry for the auditory elements, were sheltered in the housing unit to protect them from natural elements such as wind, rain, and UV exposure. A non-limiting example of a housing unit included of three clear acrylic sheets and one sheet of wood, which can be attached to the outer sides of the four galvanized poles. The three acrylic sheets had UV protectant to help protect the tactile map. One plywood sheet can be used to serve as a backing of the housing unit. In this example, the door was a front acrylic sheet that opened from the top and folded down so to remain flush with the supporting structure while in use. The housing unit also included a roof. In an example, the edges of the roof of the housing unit had a small overhang. In an example, the edges of the roof were flush with the edges of the housing unit with no overhang. While this non-limiting example provided a basic housing unit comprising acrylic sheets and plywood, all components of the tactile map, housing unit, and support structure stand can be made of other materials that are more durable. For example, commercial grade plastics and coated metals typically used on public playgrounds can be used.

The housing unit rested on a support structure that included four galvanized poles and sheets of plywood. The poles allowed for the height of the housing unit to rest between 32"-48" from the ground. A portion of the pole was cemented into the ground to ensure stability of the structure. For example, depending on the height from the ground that the housing unit will rest, up to about 25% of the length of the pole can be in the ground. The support structure also included a cutout of the enclosed area to house a stepping stool. For example, the stool can allow for the younger/shorter children to have access to the tactile map. For example, the stool can be ADA approved. In an example, the stool can be mounted to the supporting structure and fold out when needed for use.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

It is to be understood that, unless otherwise indicated, the present disclosure is not limited to particular materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Therefore, the following is claimed:

1. A tactile map system comprising:
a map base having a substantially planar substrate defining an x-y plane, the base comprising a top base surface and a bottom base surface, the top base surface comprising a ground surface texture; and
a three dimensional (3D) scaled representation of an actual physical layout of a plurality of physical structures, wherein the 3D scaled representation includes play surfaces, ramps, slides, or ground surfaces of the plurality of physical structures that are accessible by a user, wherein the 3D scaled representation omits surfaces that are not accessible by the user, the 3D scaled representation attached to the top surface of the map base, wherein a representation of an actual physical structure in the 3D scaled representation is configured with dimensions that are in proportion to the actual physical structure and extends in a z-direction from the base, the z-direction being orthogonal to the x-y plane, the 3D scaled representation comprising a plurality of identified surfaces of the plurality of physical structures, each of the plurality of identified surfaces having a surface type of a plurality of surface types, each surface type corresponding to a surface texture having a distinguishing tactile feature, wherein the plurality of identified surfaces comprise a plurality of play surfaces, ramps, slides, or ground surfaces.

2. The tactile map system of claim 1, wherein each surface type comprises a selected color.

3. The tactile map system of claim 1, further comprising a tactile indicator of a feature located on an individual physical structure.

4. The tactile map system of claim 1, further comprising an audio system configured to play a voice recorded description of at least one feature.

5. A tactile map system of claim 1, further comprising a tactile indicator or a button to activate a voice recorded description of at least one feature of the plurality of physical structures.

6. A tactile map system of claim 1, wherein the map base is inclined at an angle such that a front side of the map base is lower than a rear side of the map base.

7. A tactile map system of claim 1, further comprising a housing to enclose the 3D scaled representation attached to the map base.

8. A tactile map, comprising:
a map base having a top surface and a bottom surface, the top surface having a first texture; and
a playground model comprising a three-dimensional (3D) scaled representation of an actual physical layout of a plurality of playground structures, wherein the 3D scaled representation includes play surfaces, ramps, slides, or ground surfaces of the plurality of playground structures that are accessible by a user, wherein the 3D scaled representation omits surfaces that are not accessible by the user, the 3D scaled representation having a plurality of identified surfaces of the plurality of playground structures, each identified surface corresponding to a surface texture having a distinguishing tactile feature, the plurality of identified surfaces comprising at least one play surface and at least one slide surface, the at least one play surface having a second texture, the at least one slide surface having a third texture, the playground model attached to the top surface of the map base, wherein the plurality of identified surfaces comprise a plurality of play surfaces, ramps, slides, or ground surfaces.

9. The tactile map of claim 8, wherein:
the top surface of the map base comprises a first color;
the at least one play surface comprises a second color; and
the at least one slide surface comprises a third color.

10. A method for implementing a three-dimensional (3D) tactile map system, the method comprising:
identifying a plurality of surfaces of within an actual physical layout of a plurality of physical structures to be mapped, wherein the plurality of surfaces comprise one or more surfaces, ramps, slides, or ground surfaces of the plurality of physical structures that are accessible by a user, wherein the plurality of physical structures omit surfaces that are not accessible by the user, obtaining measurements of the actual physical layout of the plurality of physical structures, the measurements comprising measurements of each of the plurality of identified surfaces of the plurality of physical structures and spatial measurements to position the plurality of identified surfaces relative to a plane of a three-dimensional (3D) coordinate system;

assigning a surface type for each of the plurality of identified surfaces of the plurality of physical structures, wherein the plurality of identified surfaces comprise a plurality of play surfaces, ramps, slides, or ground surfaces;

selecting a surface texture to correspond with each surface type, each surface texture having a distinguishing tactile feature;

fabricating a three-dimensional (3D) model based on a scaled ratio of the measurements obtained and the selected surface texture corresponding to the surface type for each of the plurality of identified surfaces of the actual physical layout of the plurality of physical structures; and mounting the 3D model to a map base, the map base having a substantially planar substrate and comprising a top surface and a bottom surface, the 3D model positioned on the top surface.

11. The method of claim 10, further comprising assigning a surface type to the top surface of the map base.

12. The method of claim 10, further comprising selecting a surface color to correspond with each assigned surface type.

13. The method of claim 10, further comprising:

identifying a feature of an individual physical structure;

identifying at least one of: a location of the feature on the individual physical structure and a relative location with respect to an identified surface of the plurality of identified surfaces; and recording a description of the feature comprising characteristics of the feature.

14. The method of claim 13, wherein the feature is one of a plurality of features of the plurality of physical structures, wherein the plurality of physical structures comprise the individual structure, and a description of each of the plurality of features of the plurality of physical structures is recorded.

15. The method of claim 13, further comprising installing a tactile indicator of the feature on at least one of: the 3D model and the map base.

16. The method of claim 15, wherein the tactile indicator of the feature comprises a means to play a voice recorded description of the feature.

17. The method of claim 10, wherein the map base is oriented with the bottom surface parallel to a horizontal plane or positioned at an angle with respect to a horizonal plane.

18. The method of claim 10, further comprising constructing a support structure to the 3D model mounted on the map base.

19. The method of claim 18, wherein the support structure comprises a plurality of vertical surfaces configured extend downward from a perimeter of the map base, one surface of the plurality of vertical surfaces configured to be a front surface corresponding to a front orientation of the 3D model mounted on the map base.

20. The method of claim 10, further comprising constructing a housing configured to enclose the 3D model mounted on the map base and to accommodate an audio system comprising a controller and speakers, the audio system configured to play a voice recorded description of at least one feature of one of the plurality of physical structures.

* * * * *